United States Patent [19]
Falls et al.

[11] Patent Number: 5,950,198
[45] Date of Patent: Sep. 7, 1999

[54] PROCESSES AND APPARATUSES FOR GENERATING FILE CORRESPONDENCY THROUGH REPLICATION AND SYNCHRONIZATION BETWEEN TARGET AND SOURCE COMPUTERS

[75] Inventors: Patrick T. Falls, Newbury; Andy T. Wightman, Purbrook, both of United Kingdom

[73] Assignee: Novell, Inc., Provo, Utah

[21] Appl. No.: 08/823,517

[22] Filed: Mar. 24, 1997

[51] Int. Cl.⁶ .................................................. G06F 17/30
[52] U.S. Cl. ............................. 707/8; 707/203; 707/204
[58] Field of Search .................................. 707/204–203, 707/10, 8; 395/275, 200.12, 182.02

[56] References Cited

U.S. PATENT DOCUMENTS

| | | | |
|---|---|---|---|
| 4,432,057 | 2/1984 | Daniell et al. | 707/8 |
| 4,897,782 | 1/1990 | Bennett et al. | 707/10 |
| 5,151,989 | 9/1992 | Johnson et al. | 707/10 |
| 5,261,094 | 11/1993 | Everson et al. | 707/201 |
| 5,297,258 | 3/1994 | Hale et al. | 395/275 |
| 5,313,646 | 5/1994 | Hendricks et al. | 707/101 |
| 5,355,476 | 10/1994 | Fukumura | 451/487 |
| 5,388,255 | 2/1995 | Pytlik et al. | 445/26 |
| 5,434,994 | 7/1995 | Shaheen et al. | 707/201 |
| 5,452,448 | 9/1995 | Sakuraba et al. | 707/201 |
| 5,572,729 | 11/1996 | Giordano et al. | 707/200 |
| 5,574,906 | 11/1996 | Morris | 707/1 |
| 5,583,995 | 12/1996 | Gardner et al. | 395/200.49 |
| 5,588,147 | 12/1996 | Neeman et al. | 707/1 |
| 5,613,113 | 3/1997 | Goldring | 707/202 |
| 5,634,052 | 5/1997 | Morris | 707/1 |
| 5,732,214 | 3/1998 | Subrahmanyam | 395/200.12 |
| 5,745,748 | 4/1998 | Ahmad et al. | 707/10 |
| 5,761,677 | 6/1998 | Senator et al. | 707/203 |
| 5,765,171 | 6/1998 | Gehani et al. | 707/203 |
| 5,765,173 | 6/1998 | Cane et al. | 707/204 |
| 5,778,165 | 7/1998 | Saxon | 395/182.02 |
| 5,799,322 | 8/1998 | Mosher, Jr. | 707/202 |
| 5,862,325 | 1/1999 | Reed et al. | 395/200.31 |

OTHER PUBLICATIONS

Michael Leon Kazar, Synchronization and Caching Issues in the Andrew File System, USENIX—Feb. 9–12, 1988, Dallas Texas, pp. 27–36.

Timothy Mann, et al., An Algorithm for Data Replication, Jun. 1, 1989, Digital Systems Research Center, Palo Alto, California, pp. 1–55.

Michael D. Schroeder, et al., A Caching File System For a Programmer's Workstation, 1–4 Dec. 1985, 10th ACM Synmposium on Operating Systems Principles, pp. 25–34.

M. J. Bach, et al., A Remote–File Cache for RFS, Jun. 8–12, 1987, USENIX—Phoenix, Arizona, pp. 273–279.

Richard G. Guy, et al., Implementation of the Ficus Replicated File Systems, USENIX—Jun. 11–15, 1990, Anaheim, California, pp. 63–70.

Alex Siegel, et al., Deceit: A Flexible Distributed File System, Dec. 7, 1989, TR 89–1042, Cornell University, Ithaca, New York, pp. 1–34.

Gene T. J. Wuu, et al., Efficient Solutions to the Replicated Log and Dictionary Problems, Jan., 1986, Operating Systems Review, vol. 20, No. 1, State University of New York at Stony Brook, Long Island, New York, pp. 57–66.

(List continued on next page.)

*Primary Examiner*—Thomas G. Black
*Assistant Examiner*—Charles L. Rones
*Attorney, Agent, or Firm*—Dinsmore & Shohl LLP

[57] ABSTRACT

Processes and apparatuses are provided for generating file correspondency between a source computer and a target computer. The process comprises determining a first source file key for at least a portion of the source file and searching for an existing file having at least a portion thereof represented by a first existing file key which matches the first source file key. If the first existing file key is located and if the portion of the existing file represented by the first existing file key is also disposed on the target computer, the file correspondency is generated by accessing the portion of the existing file represented by the first existing file key which is disposed on the target computer.

29 Claims, 7 Drawing Sheets

OTHER PUBLICATIONS

Fowler, et al., A User–Level Replicated File System, USENIX—Jun. 21–25, 1993, Cincinnati, Ohio, pp. 279–289.

O. P. Brereton, Management of Replicated Files in a UNIX Environment, 1986, John Wiley & Sons, Ltd., pp. 771–780.

Titus M. Purdin, et al., A File Replication Facility for Berkeley Unix, 1987, John Wiley & Sons, Ltd., pp. 923–940.

Dean Daniels, et al., An Algorithm for Replicated Directories, May 31, 1983, Technical Report CMU–CS–83–123, pp. 0–22.

Anna Hać, A Distributed Algorithm for Performance Improvement Through File Replication, File Migration, and Process Migration, IEEE Transactions on Software Engineering, vol. 15, No. 11, Nov., 1989, pp. 1459–1470.

Katia Obraczka, et al., A Tool for Massively Replicating Internet Archives: Design, Implementation, and Experience, 1996 IEEE, pp. 657–664.

PROCESSES AND APPARATUSES FOR GENERATING FILE CORRESPONDENCY THROUGH REPLICATION AND SYNCHRONIZATION BETWEEN TARGET AND SOURCE COMPUTERS

TECHNICAL FIELD OF THE INVENTION

This invention relates generally to the field of apparatuses and processes for generating file correspondency between computers, and, more particularly, to apparatuses and processes for generating file correspondency by file synchronization, file replication, and combinations thereof.

BACKGROUND OF THE INVENTION

Today's fast-paced global business environment often requires that widely distributed groups of people have immediate access to information and resources. Increasingly, this access has been provided by interconnecting computers and other devices (e.g., printers, modems, storage devices, and the like) to form computer networks so that information and resources can be more quickly shared among the network users. Computer networks can generally be broken down into two broad categories: local area networks, or LANs, which typically cover short distances, such as within a building, and wide area networks, or WANs, which cover extended distances, such as between cities or countries. LANs and WANs can be interconnected using devices such as bridges, routers, and gateways.

With computer networks, people who are separated by a great distance can share information and resources. However, the data transfer rate across wide area links is often intermittent and slow. For example, local area networks can transfer data at speeds up to 100 megabits per second while some wide area networks operate at a slow 56 kilobits per second.

In addition to slow transfer rates once a network connection is established, network latency can also affect the effective time required to transfer data across a computer network. More particularly, network latency refers to delays in data transfer caused by implementation of the network transfer protocols. For example, algorithms are typically executed which encapsulate the data to be transferred in one or more packets prior to transfer across the network link. To help alleviate the time delays associated with the latency and data transfer rate problems, computer files (e.g., system files, utility files, application files, etc.) are often replicated or copied to the LANs or local computers on which they will be used. In this manner, shared resources are placed closest to the user who can access the information at LAN speeds, rather than having a central repository (such as on a single computer server) which must be accessed at slow WAN speeds.

Although the above-described arrangement can provide increased speed for network users, as well as system robustness, file correspondency on the computer network must now be addressed by network administrators. A practical example of the necessity of maintaining file correspondency occurs when a computer application, such as a word processing program, is updated and the new version is to be installed on the computer network. Because word processing applications are most often installed on computers close to the end user, multiple copies of the older version of the word processing application can be distributed across the computer network and require updating. Presently, a network administrator faced with the problem of generating file correspondency across the computer network with respect to the new application can either manually copy or replicate all the application files to the designated computers across the network or write a batch file to execute the same. However, these processes are inefficient and can tax costly network resources because any large files of the new application are being transferred across slow WAN links, thereby tying up these links which may be needed for more critical data transfers. In order to alleviate these and other similar shortcomings regarding file correspondency processes, there is a desire to provide improved apparatuses and methods which can generate file correspondency between computers by locating and using a file on a target computer which matches the file on the source computer for which correspondency is desired, regardless of the name under which the matching file is stored or its location (e.g., directory, volume etc). Once a matching file is located on the target computer, file correspondency can be more quickly generated between the computers by such a process by using the matching file on the target computer. This would reduce the amount of data transferred across the computer network, thereby reducing the negative impacts which latency and slow data transfer rates can have on a file correspondency process.

SUMMARY OF THE INVENTION

Accordingly, it is an object of the present invention to obviate the above-described problems and shortcomings by providing processes and apparatuses for quickly and efficiently generating file correspondency between computers.

It is another object of the present invention to provide processes and apparatuses for generating file correspondency by locating matching files on a target computer regardless of the location or name of the matching file.

It is still another object of the present invention to provide processes and apparatuses for generating file correspondency which can accommodate files comprising at plurality of partial files.

It is a further object of the present invention to provide processes and apparatuses for generating file correspondency which can be implemented using an object oriented schema.

In accordance with one aspect of the present invention, a process for generating file correspondency between a source computer and a target computer is provided comprising the steps of determining a first source file key for at least a portion of a source file, searching for an existing file having at least a portion thereof represented by a first existing file key which matches the first source file key, and if the first existing file key is located and if the portion of the existing file represented by the first existing file key is also disposed on the target computer then accessing the portion of the existing file which is disposed on the target computer for generating the file correspondency. This process can be implemented by a computer system having a reader routine for reading the first source file key and the first existing file key, a comparator routine in data communication with the reader routine for comparing the first source file key and the first existing file key, and a replication/synchronization routine in data communication with the comparator routine with the replication/synchronization routine having a set of instructions for generating file correspondency between the source computer and the target computer by accessing at least a portion of the existing file disposed on the target computer.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE PREFERRED EMBODIMENTS

Reference will now be made in detail to the present preferred embodiments of the invention, examples of which are illustrated in the accompanying drawings wherein like numerals indicate the same elements throughout the views. The present invention can accommodate apparatuses and processes for generating file correspondency between a source computer and a target computer by utilizing file synchronization and/or file replication, while minimizing network traffic by accessing an existing file disposed at the target computer to implement these processes. As used herein, the phrase "file correspondency" and its derivatives is intended to mean a state wherein a file located on a first computer matches (i.e., is substantially similar to, or, more preferably, is identical to) a second file on a second computer.

The phrase "file synchronization" and its derivatives is intended to generally mean herein a process whereby a file, which is disposed at two locations, is changed at one of the locations and these changes are then implemented at the second location. For instance, suppose a file, copies of which are located on two distinct computers, is modified at one location. The process of updating the unedited file at the second location so that it matches the edited file at the first location is a form of file synchronization. In contrast, the phrase "file replication", as used herein, is intended to generally mean the process by which a master file (or a portion thereof) existing at a first location, but not a second location, is created at the second location so that two identical copies exist following the replication, a master file at the first location and a replica file at the second location. While the present invention is described herein with respect to the processes of file synchronization and file replication, it is contemplated that the same can be equally adapted for generating correspondency for other network entities, such as file directories, and databases.

Figure 1:
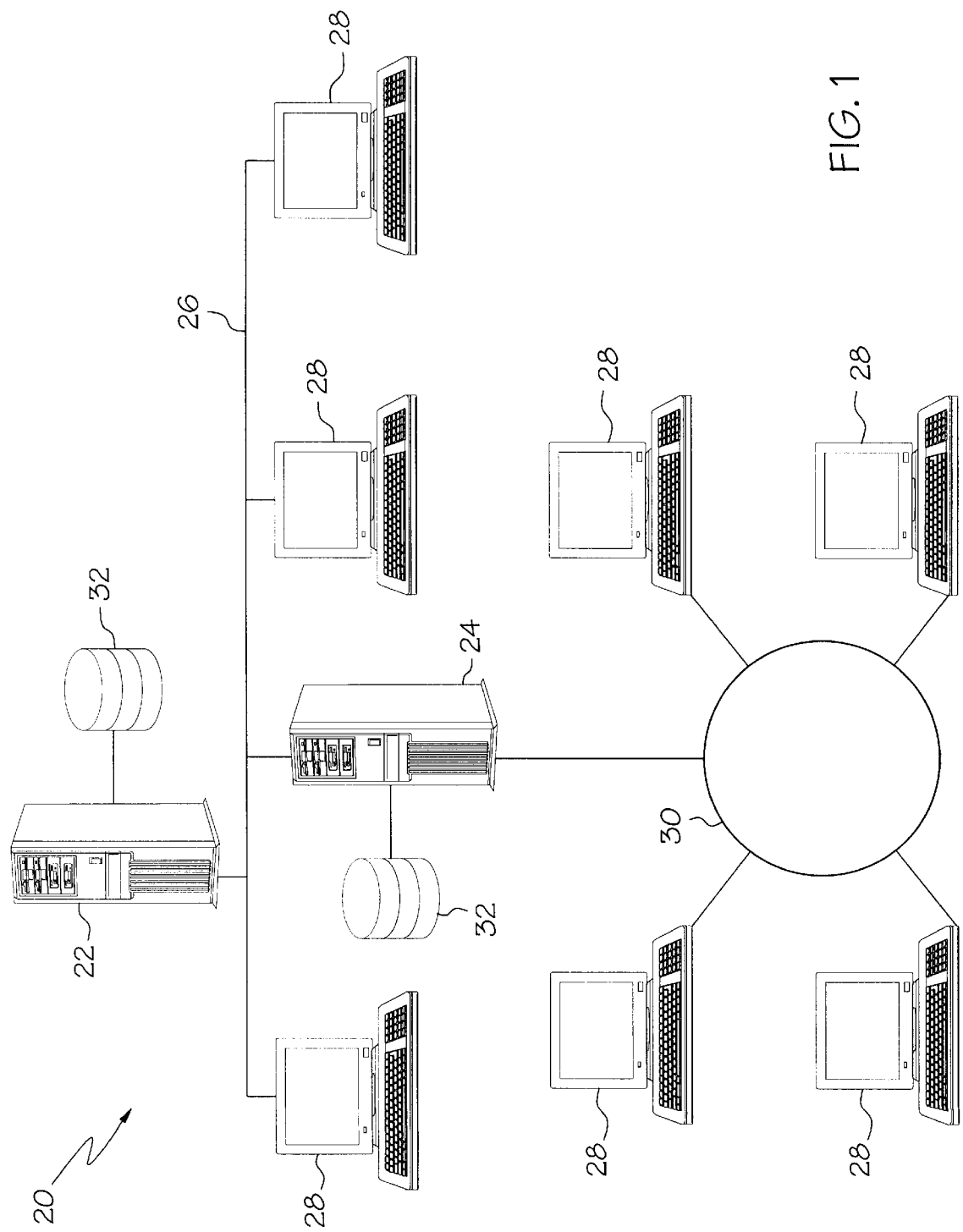
FIG. 1. is a schematic illustration of a computer network suitable for use with the present invention.

One of the many computer networks suited for use with the present invention is indicated generally at 20 in FIG. 1, wherein a source computer 22 (illustrated as a network server) is connected to a target computer 24 (also illustrated as a network server) by network signal lines 26. In addition to a network server, the source computer 22 and/or the target computer 24 can be provided in the form of any conventional or special-purpose computer, such as a desktop computer, a tower computer, a micro-computer, a mini-computer, and a mainframe computer as well as a palmtop computer, a notebook computer, or a personal digital assistant. These other computer forms are generically represented by computers 28 in FIG. 1. The network signal lines 26 can be provided in the form of twisted pair, coaxial, optical fiber cables, telephone lines, satellites, microwave relays, and other data transmission means known to those of skill in the art.

In addition, the network 20 preferably includes NOVELL INTRANETWARE (version 1.x). Alternatively, the network operating system can comprise Personal NetWare, VINES, Windows NT, LAN Manager, or LANtastic network operating system software (VINES is a trademark of Banyan Systems; NT and LAN manager are trademarks of Microsoft Corporation; and LANtastic is a trademark of Artisoft), or any other network operating system known to those skilled in the art. The network 20 can comprise one or more other networks 30 which can be provided in the form of a local area network, wide area network, or portions of the Internet and which are connected by a gateway or similar mechanism.

As illustrated in FIG. 1, the source computer 22 and the target computer 24 each preferably comprise a storage medium 32, which can be provided in the form of a floppy drive, a tape drive, an optical drive, or any other magnetic, optical, or computer-readable storage device having a specific physical substrate configuration. The substrate configuration represents data and instructions which cause the computer to which it is connected to operate in a specific and predefined manner as described herein. Thus, the storage medium 32 tangibly embodies a program, functions, and/or instructions that are executable by at least the source computer 22 and the target computer 24 to perform the file correspondency steps discussed hereafter. Other examples of an appropriate storage medium 32 can include a hard disk, a CD-ROM, PROM, RAM and the like. In addition, those of skill in the art will realize that other devices (e.g., a printer or an array of disks) can be connected to the network 20. Consequently, those of skill in the art will appreciate that the present invention will work with a variety of other networks and computers, although particular individual devices and computer systems are described for ease of discussion.

Figure 2:
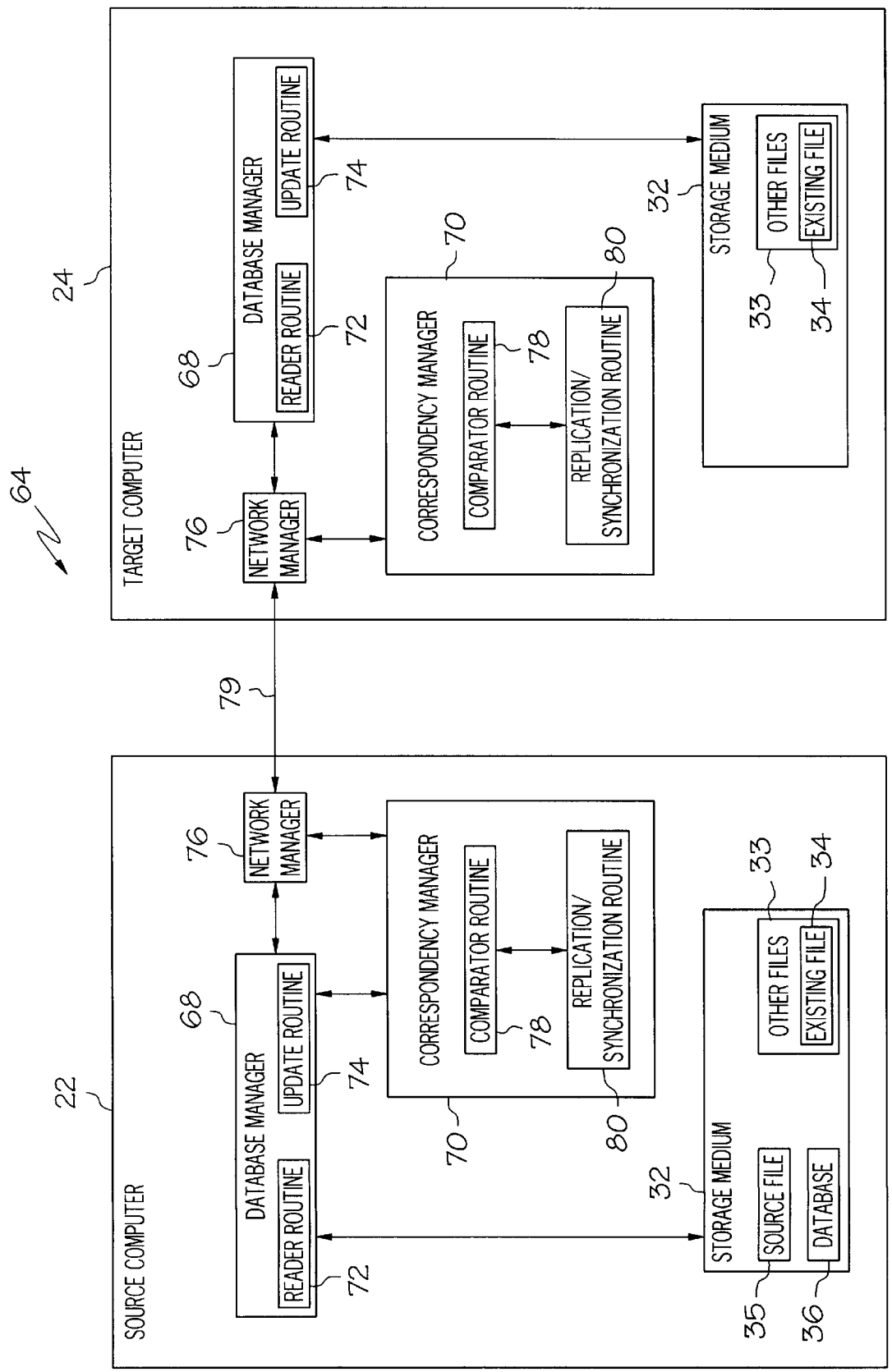
FIG. 2 is a schematic illustration of a computer system made in accordance with the present invention.

As shown in FIG. 2, the storage mediums 32 of the source computer 22 and the target computer 24 preferably also store thereon a plurality of other computer files 33, examples of which can include word processing and spreadsheet files, system utility files, system operating files, application files, and the like. By way of example, one of the computer files 33 is illustrated generically as an existing file 34. In addition, the storage medium 32 of the source computer 22 comprises a source file 35, the source file 35 being, for the purposes of discussion herein, the file for which file correspondency is to be established with respect to the target computer 24. The source file 35 can be provided in the form of any type of computer file (e.g., a word processing file, utility file, etc.).

In accordance with one aspect of the present invention, the arrangement and attributes of the computer files 33 on the storage medium 32 can be represented by an object-oriented database 36 which is managed by a software application disposed on the source computer 22 and the target computer 24 and which is referred to herein as a database manager 68. A database is a collection of related objects, each object having associated attributes which can assume one or more values at any given time. Each object can represent a physical network entity or a logical network entity. Physical network entities can include, for example, a network server, a network client, or a computer file. Logical network entities can include a computer user, a group of users, etc. Since a computer network can have a plurality of physical and logical network entities, the objects can be organized for convenience into an object-oriented hierarchal structure called a tree. The hierarchal tree along with the rules for defining the objects is sometimes referred to as a schema.

The database 36 which is managed by the database manager 68 has a schema preferably comprising at least three major components: classes, properties or attribute type definitions for each class, and attribute syntaxes for each attribute type. These three components establish the rules that control the creation of a particular object or instance of a class of the schema. Particularly, the classes define the type of objects that can be created and stored in the database 36. Each class is defined in terms of attribute or property definitions with the attribute types, in turn, being defined in terms of the attribute syntaxes. The attribute syntaxes are the data type of the values or information that can be stored in the attribute. Attribute syntaxes thus correspond roughly to data types such as integer, float, string, or boolean in conventional programming languages. This schema is used as a set of rules to create the individual objects or instances of a class and determine the object's set of characteristics. Consequently, every object in the hierarchical tree belongs to a class that specifies which attributes can be used (or must be used) as well as where objects can be created in relation to other objects.

Figure 3:
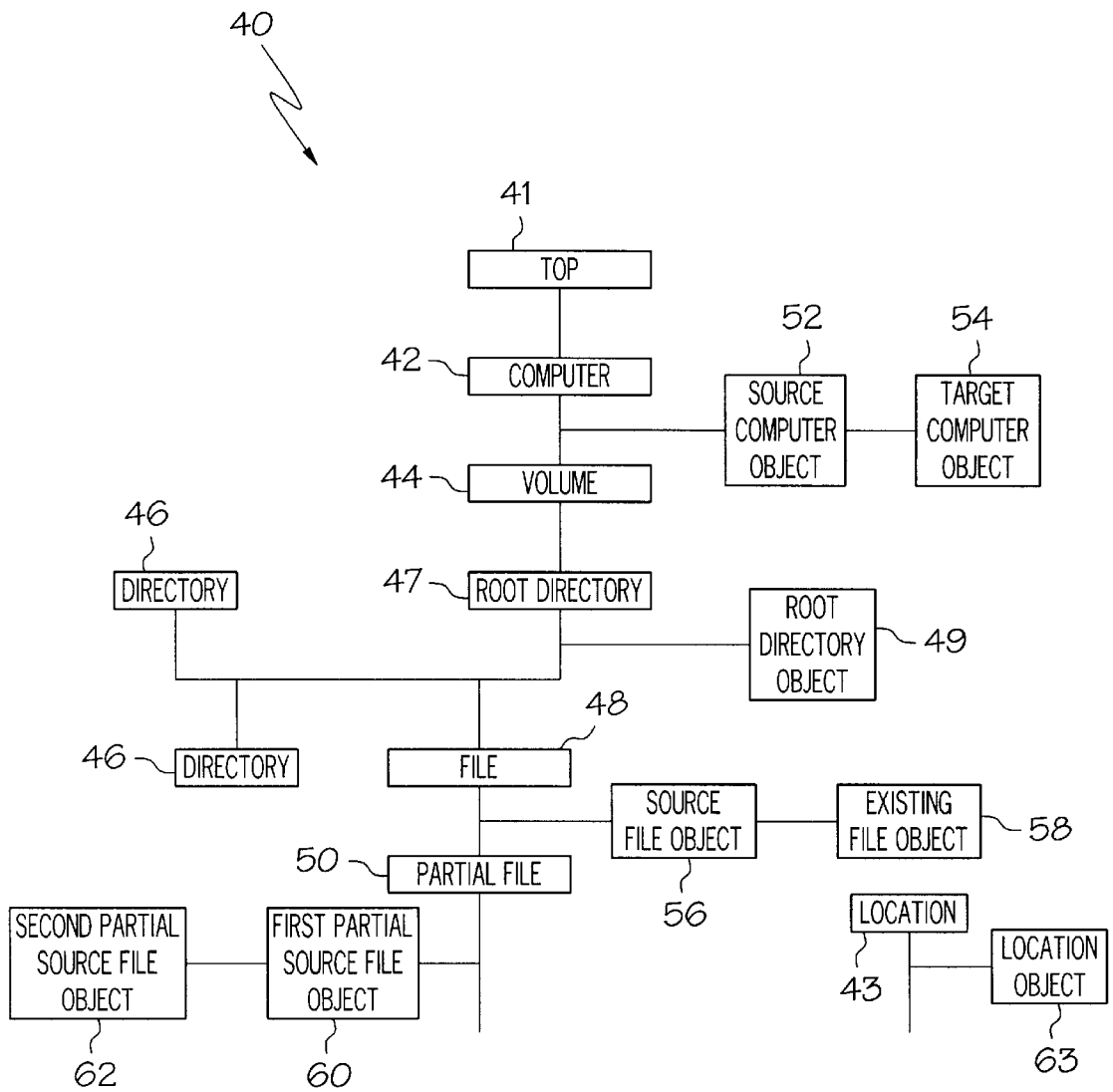
FIG. 3 is a schematic illustration of the hierarchical structure of a preferred schema suitable for use with the present invention.
Figure 4:
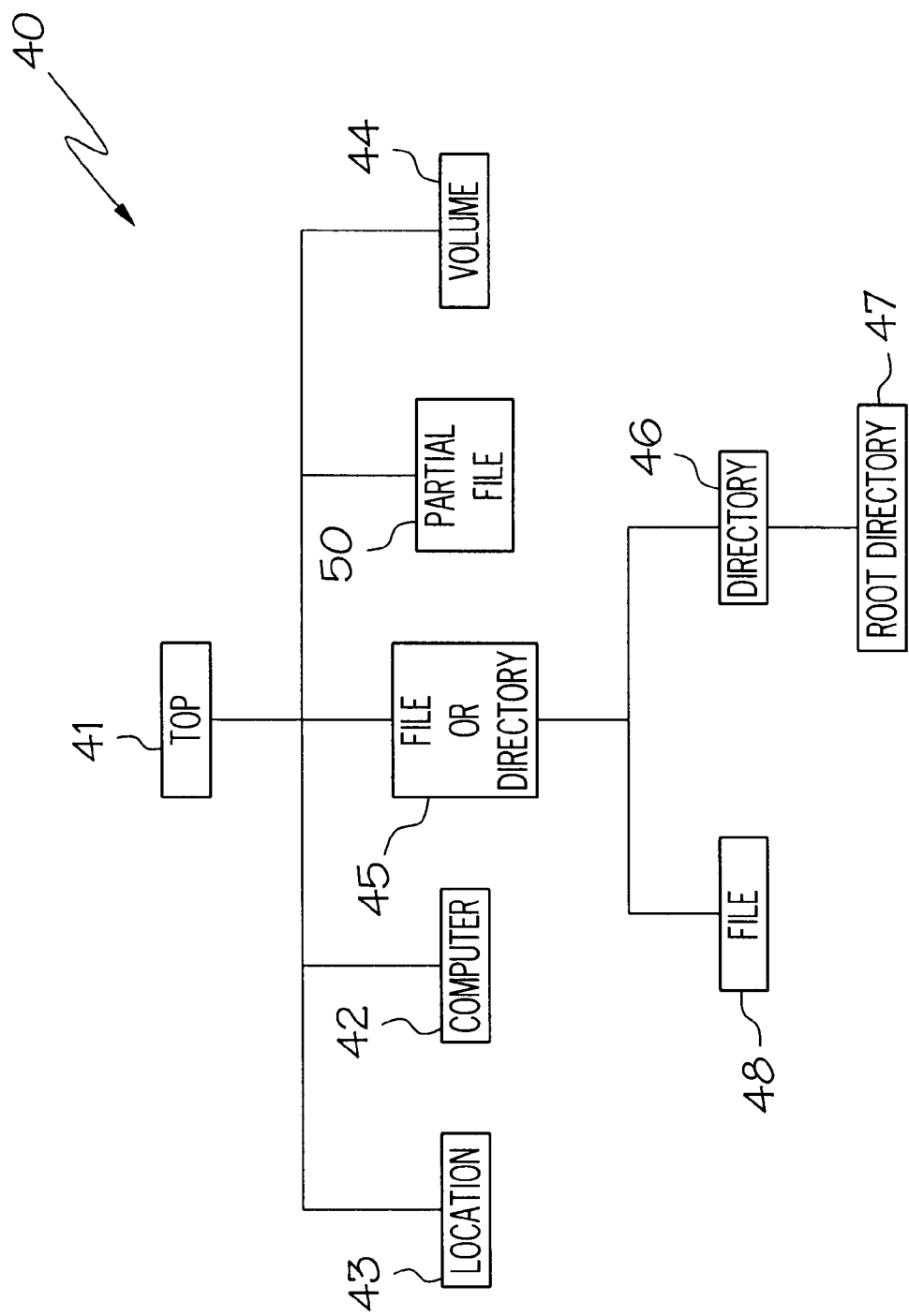
FIG. 4 is a schematic illustration of the inheritance structure of the preferred schema of FIG. 3.

Referring now to FIGS. 3 and 4, a preferred schema 40 defining the objects of the database 36 will now be described. Each class has a name which identifies the class, a set of superclasses which identifies the other classes from which this class inherits attributes, and a set of containment classes that identifies the classes permitted to contain instances of this class. In other words, the containment class list specifies where the individual classes can appear within the hierarchial tree and builds the relationship between the classes within the hierarchial tree, as illustrated in FIG. 3, while the internal structure of the schema is built using a superclass list which specifies from which classes an individual class can inherit attributes, as illustrated in FIG. 4. Consequently, a complete definition for a class is derived from the components of the class itself plus all the components of its superclass.

Preferably, the schema 40 comprises the following classes: TOP 41, COMPUTER 42, LOCATION 43, VOLUME 44, FILE_OR_DIRECTORY 45, DIRECTORY 46, ROOT DIRECTORY 47, FILE 48, and PARTIAL FILE 50. While these classes are discussed herein by way of example, it is contemplated that other arrangements for the schema 40 and additional classes can added as desired. For example, the schema 40 could be further expanded to include a class for trustee rights.

The TOP class 41 preferably has two attributes: an identifier attribute and a parent identifier attribute. The parent identifier attribute stores a reference to the parent object of a particular object (i.e., a reference to an object associated with the containment class of the class of which the particular object is an instance) while the identifier attribute is a unique identifier for this object. Each class below the TOP class 41 inherits these attributes, as illustrated by FIG. 4.

The objects of the COMPUTER class 42 represent the computers or servers which are connected to the network 20. Objects of the COMPUTER class 42 representing the source computer 22 and the target computer 24 are shown as source computer object 52 and target computer object 54, respectively. Since the computer network 20 can contain many computers, the name of each computer can be treated as a unique searchable key for computers within the database 36. The objects of the VOLUME class 44 represent the volumes of the storage medium 32. Each volume has a name, which should be unique within the computer and can be used as the root component of a directory path name on the storage medium. The VOLUME class 44 is placed within the hierarchial tree below the COMPUTER class 42 and objects of this class preferably inherit the attributes of TOP class 41.

The FILE_OR_DIRECTORY class 45 preferably has attributes which are common for objects of both the FILE class 48 and the DIRECTORY class 46. Such attributes can include, for example, the date and time either an object of the FILE class 48 or the DIRECTORY class 46 was modified as well as a name attribute for identifying the objects. However, the FILE_OR_DIRECTORY class 45 does not appear in the hierarchial tree of FIG. 3 because objects of this class do not exist. Objects of the DIRECTORY class 46 represent the various directories and subdirectories which comprise the file directory system of a computer connected to the network 20. Also, the DIRECTORY class 46 appears twice within the hierarchial tree of FIG. 3 because a directory can be a sub-directory of another directory, and, therefore, a directory object can be contained within another directory object as represented by the hierarchial tree of FIG. 3. An exemplary object of the DIRECTORY class 46 is illustrated as a directory object 49 in FIG. 3. With respect to the FILE class 48, this class is located below both the DIRECTORY class 46 and the ROOT DIRECTORY class 47 (thus these classes are containment classes for the FILE class 48) in the hierarchial tree and objects of the FILE class 48 preferably inherit attributes from FILE_OR_DIRECTORY class 45, as do objects of the DIRECTORY class 46. Objects of the ROOT DIRECTORY class 47 represent the topmost directory of a volume (i.e., the root directory). Typically, there is only one root directory per volume. The ROOT DIRECTORY class 47 inherits the attributes of the DIRECTORY class 46 and is placed below the VOLUME class 44 in the hierarchial tree of FIG. 3.

Objects of the FILE class 48 representing the source file 35 and the existing file 34 are shown, respectively, as a source file object 56 and an existing file object 58. In addition and in accordance with another aspect of the present invention, the FILE class preferably includes a key attribute for storing a key representing at least a portion of the computer file represented by an object of this class (e.g., for storing a key for the existing file 34 represented by existing file object 58). For example, this attribute could store a checksum which is a pattern of bits generated by an algorithm such that a distinctive pattern is generated for each file or string analyzed by the algorithm. Thus, each computer file (or portion thereof) can be represented by a checksum bit pattern which is then stored in the key attribute. Alternatively, the key can comprise a Cyclic Redundancy Check character, or CRC. The CRC is a remainder from the division of a polynomial representing a computer file (or portion thereof) by another polynomial such that the remainder from the division represents a value for the computer file. Preferably, each of these methods produces a unique key for each distinct file, although due to the vagaries associated with these processes it is possible that two distinct files can be represented by the same key, as discussed more fully hereafter. In another embodiment, the key attribute also stores a flag indicating that the key attribute is in the "on"

condition (i.e., that the attribute contains a key) or the "off" condition indicating that it does not. This can be useful if, for instance, a key is to be calculated only for files having a predetermined minimum size, where the predetermined size represents the point at which a correspondency process utilizing a key is more efficient than one without. In another preferred embodiment, the FILE class 48 also preferably comprises a size attribute. The size attribute stores the size of the file, preferably in bytes. Thus the definition of an exemplary FILE class can be written as follows;

```
CLASS    FILE
{
    SUPERCLASS: FILE_OR_DIRECTORY;
    CONTAINMENT CLASS: DIRECTORY, ROOT DIRECTORY;
    ATTRIBUTES
    {
        KEY
        SIZE
    }
}
```

The objects of the PARTIAL_FILE class represent predetermined ranges of data, such as an incompressible range or the like, within a specific computer file. Thus, it is possible that a single aggregate computer file (e.g., the source file 35) can be split into one or more partial files (e.g., first and second partial source file objects 60 and 62 in FIG. 4). For example, a partial file can comprise a bitmap picture, text, or the like. A preferred attribute of this class includes an offset attribute which describes the location of the partial file within the aggregate file, preferably as distance in bytes, from the beginning of the aggregate file. The superclass and containment classes of this class is the TOP class 41 and the FILE class 48, respectively. Thus, the objects of this class would inherit the attributes of the TOP class 41. In addition, the PARTIAL_FILE class 50 preferably has a key and size attribute which are similar to the key and size attributes previously discussed with respect to the FILE class 48. The definition of PARTIAL_FILE class can be written as follows:

```
          CLASS    PARTIAL_FILE
          {
              SUPERCLASS: TOP;
              CONTAINMENT CLASS: FILE;
              ATTRIBUTES
              {
              SIZE
              KEY
              OFFSET
              }
          }
```

The LOCATION class 43 preferably inherits the attributes of the TOP class 41 as illustrated in FIG. 4, but does not have a containment class because objects of the LOCATION class 43 can appear anywhere within the hierarchial tree of the schema 40. In addition to the attributes of the TOP class 41, the LOCATION class 43 also preferably has a replication attribute which is a reference to a computer object identifying a computer on which a directory containing this location object has been replicated. For example, a location object 63 is illustrated in FIG. 3 below the LOCATION class 43. If a directory represented by the directory object 49 contains the location object 63 and this directory has been replicated to the target computer 24, the location object 63 would contain a reference to the target computer object 54. While the present invention is preferably implemented using the schema 40, it is contemplated that the present invention can also be implemented without the schema 40, wherein the attributes described herein are directly associated with entities such as a file or directory, rather than with objects in a schema which represent these entities. For example, the present invention could be implemented by associating a key attribute directly with a file or a partial file and then implementing the processes described hereafter.

Referring again to FIG. 2, a computer system 64 made in accordance with the present invention will now be described. As previously discussed, the source computer 22 and the target computer 24 preferably comprise a storage medium 32 for storing, in part, the database 36, comprising the objects of the schema 40. Thus, the database 36 preferably comprises objects representing the computer files 33 as well as objects for the volume and directories of the storage medium 32 of its respective computer. While the database 36 is illustrated for purposes of discussion as residing on the storage medium 32 of the source computer 22, it is contemplated that replicas or variations of the database 36 can also be disposed on the storage medium 32 of the target computer 24 or other computers 28 of the network 20.

As shown in FIG. 2, the source computer 22 and the target computer 24 each further preferably comprise a database manager 68 which is in data communication with a correspondency manager 70. The database manager 68 is also in data communication with the storage medium 32 such that the information stored within the database 36 can be accessed by the database manager 68. Specifically, the database manager 68 comprises a reader routine 72 which can read the attribute values for the objects stored in the database 36, and, therefore the reader routine 72 is capable of reading, for example, a key, a size value, an offset value, computer location reference, or any other attribute values stored in the objects within the database 36. The database manager 68 also preferably comprises an update routine 74 which is a background process for automatically recalculating and updating the attribute values (e.g., key, size value, etc.) of the objects stored by the database 36. Alternatively, the update routine 74 can be executed by a command from a user of the computer. The update routine 74 also preferably detects the presence of computer files on the storage medium 32 which are not represented by objects in the database 36, as would be the case where a computer file was stored on the storage medium 32 after the last periodic update cycle. In this situation, the update routine 74 preferably calculates the appropriate attribute values for a new object representing the new computer file (i.e., creates an instance of the FILE class) and writes this information to the database 36.

The correspondency manager 70, which is in data communication with a network manager 76, preferably comprises a comparator routine 78 and a replication/synchronization routine 80. The comparator routine 78 further comprises a set of instructions for comparing the keys of two computer files, such as between the keys of the source file 35 and the existing file 34. So that the comparator routine 78 can execute its instructions, the database manager 68 is adapted to pass to the correspondency manager 70 the keys read from the database 36 by the reader routine 72.

The network managers 76, which are in data communication with their respective correspondency managers 70, are adapted to establish a network connection 79 between the source computer 22 and the target computer 24. For example, the network manager 76 can implement Internet Packet Exchange (IPX) and Sequence Packet Exchange (SPX) protocols, or TCP/IP, or any other communication protocols known to those skilled in the art. Alternatively, the network connection 79 can be established by using any packet-based or serial network transmission system or protocol.

Figure 5:
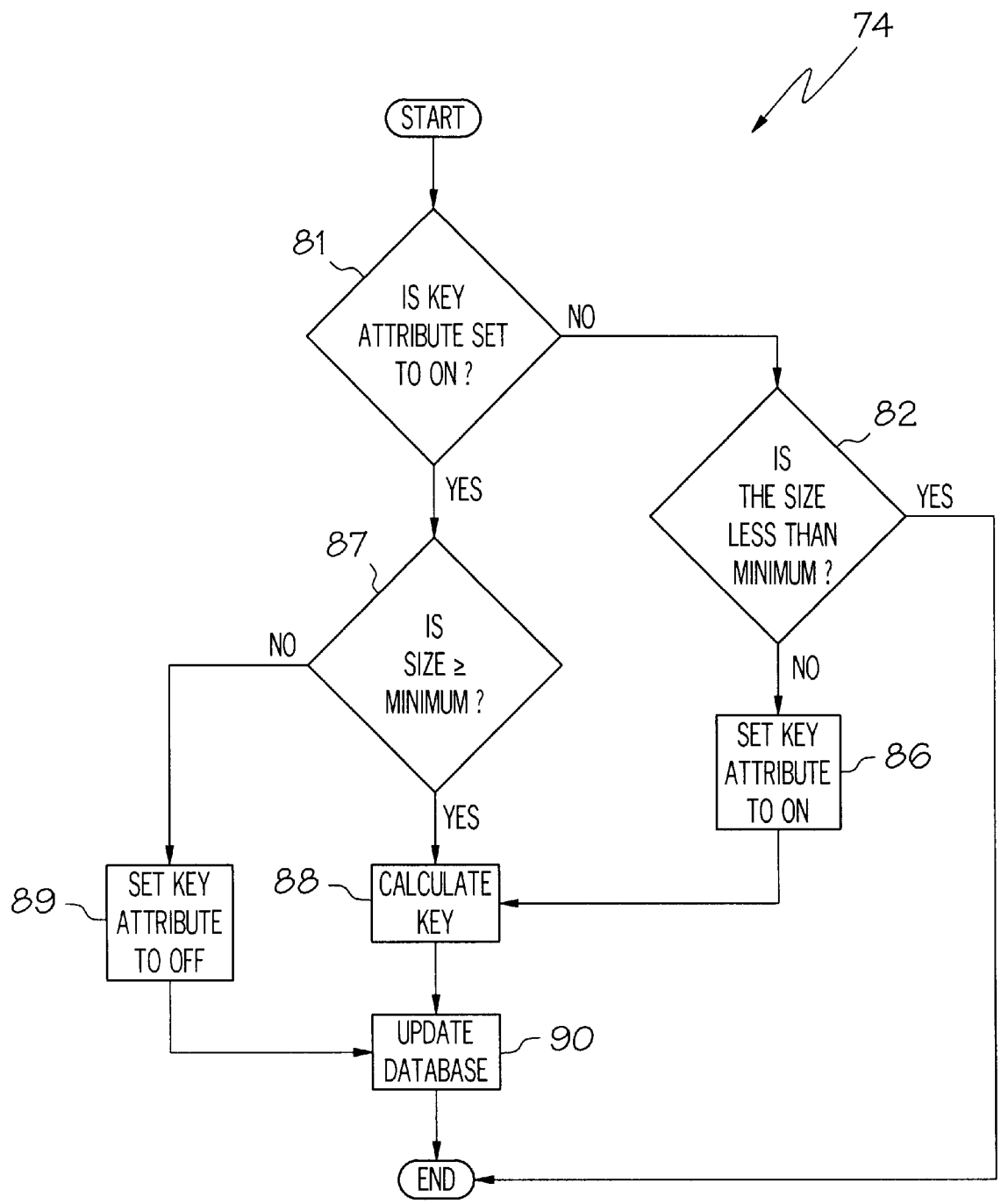
FIG. 5 is a flowchart illustrating a preferred embodiment of the update routine of the computer system of FIG. 2.
Figure 6:
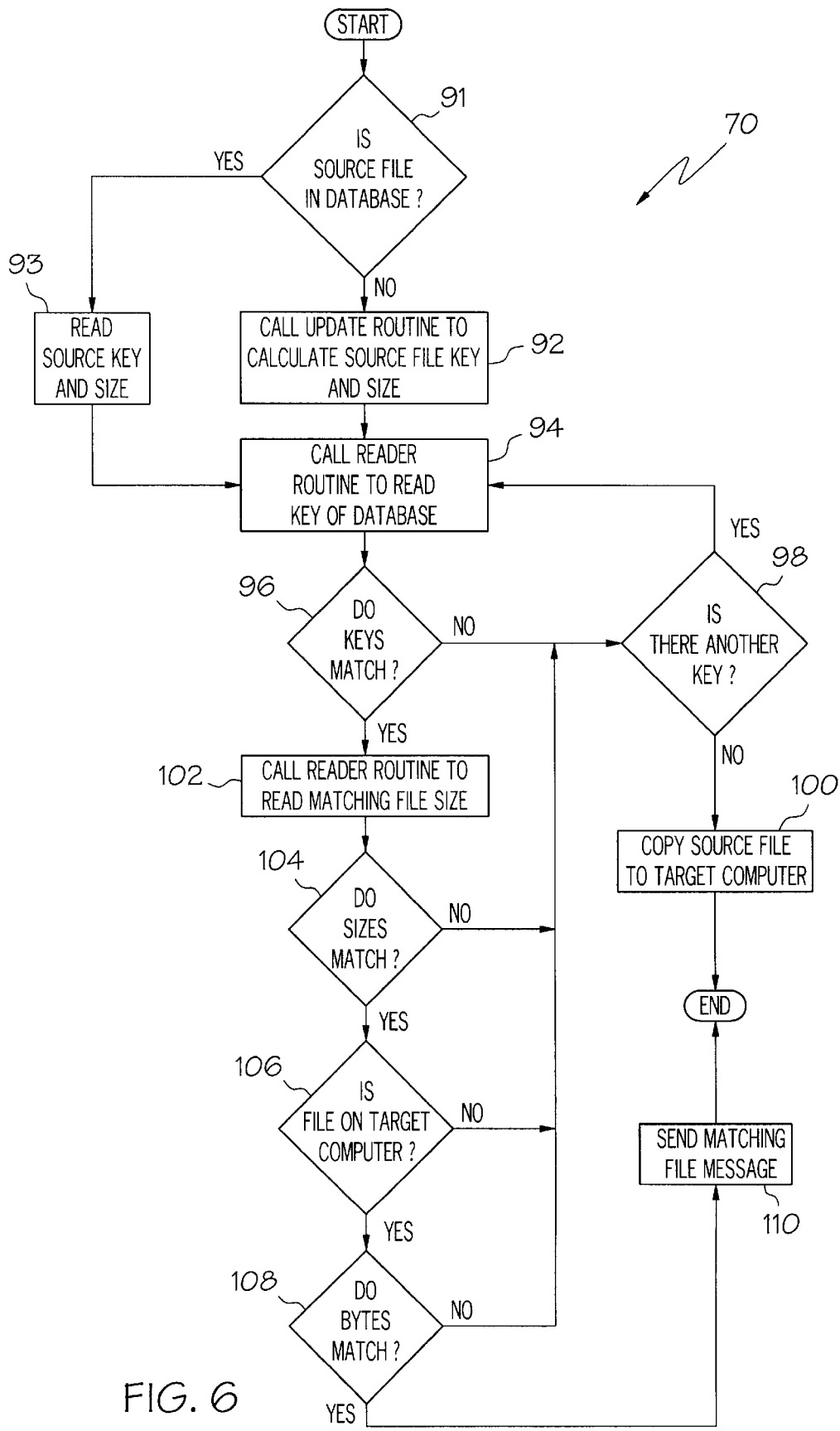
FIG. 6 is a flowchart illustrating a preferred embodiment of a file correspondency process operated in accordance with the present invention.

A preferred process for generating file correspondency with respect to the source file 35 disposed on the source computer 22 and the target computer 24 will now be described in more detail, beginning with the update routine 74. A preferred method for implementing the update routine 74 is illustrated in FIG. 5 with respect to a generic computer file (e.g., existing file 34, source file 35, etc.) located on the storage medium 32 of the source computer 22. While it is contemplated that the update routine 74 can be implemented as a low-priority background process which executes automatically depending upon the availability of system resources, it can also be initiated by a specific system event (e.g., copying a file onto the storage medium 32) or by a command from a user of the computer on which the database manager 68 resides (e.g., block 92 of process 70 as shown in FIG. 6). Preferably, the update routine 74 begins execution with block 81, wherein it is determined whether the key attribute for an object representing a computer file stored on the storage medium 32 of the source computer 22 has been set to the on condition (i.e., the key attribute contains a key). If the key attribute has not been set to the on condition, execution passes to block 82 where it is determined whether the size of the computer file exceeds a predetermined minimum size.

If the size is less than the predetermined minimum, such as 20 kilobytes, the key attribute will remain in the off condition. The predetermined minimum is preferably set such that below the minimum, the cost to system resources to use the key is greater than the performance benefits gained. If the computer file does not have its key attribute set to the on condition because the file size is below the predetermined minimum, this computer file will not be available for use by the correspondency manager 70, whose operation is described hereafter. If the file size is greater than or equal to the predetermined minimum, the key attribute will be set to the on condition in block 86 and the key calculation step of block 88 is then executed. If it was determined in block 81 that the key attribute was already set to the on condition, execution passes to block 87 where it is determined if the size of the file is still greater than or equal to the predetermined minimum. If it is, block 88 is executed and the key is calculated. If it is not, the key attribute is set to the off condition in block 89.

As previously discussed, the key can be calculated using a checksum algorithm, CRC algorithm, or the like. After calculating the key, execution passes to block 90 where this value or pattern is written to the database 36 along with a value signifying that the key attribute is in the on condition. If the key was set to the off condition in block 89, the database is also updated with this information in block 90. As shown in FIG. 2, the database manager 68, which calls the update routine 74, is in data communication with the storage medium 32 so that the key stored thereon can be accessed and modified by the update routine 74 through the reader routine 72, the reader routine 72 having the appropriate instructions for reading and writing to the storage medium 32. While the above-described steps for implementing the update routine 74 are preferred, it is contemplated that modifications can be made, such as by adding steps, deleting steps, or modifying existing steps. For example, the update routine 74 can be used to calculate other object attributes, such as the file size or the file offset, if appropriate.

Referring now to FIG. 6, a preferred process for implementing the correspondency manager 70 will now be discussed. Execution preferably begins at block 91 where it is determined whether the source file 35 already exists in the database 36. If it does, execution passes to block 93 where the reader routine 72 of the database manager 68 is called to read the key and size of the source file 35 from the database 36. If the source file is not in the database 36, block 92 is executed where the update routine 74 of the database manager 68 of the source computer 22 is called to calculate the key for the source file 35. Thus, the key associated with the source file 35 can be first determined either by calculating the key in block 92 if it does not already exist or reading the key from the database 36 if it does. Next, a search is made in block 94 of the database 36 of the source computer 22 for an existing computer file which is disposed on the source computer 22 having a key which matches the key of the source file 35. This is accomplished by calling the reader routine 72 of the database manager 68 which reads the key attributes of the objects stored in the database 36 of the source computer 22 and searches for key attributes which are set to the on condition. If a key attribute is set to the on condition, the key stored in the key attribute is passed back to the correspondency manager 70, where block 96 having the comparator routine 78 is executed. The comparator routine 78 compares the key returned by the database manager 68 in block 94 to the key calculated for the source file 35. If the keys match (i.e., indicating that the files correspond or match), execution is passed to block 102. If the keys do not match, execution is returned to block 94 if block 98 determines that there is another key in database 36 which has not been compared to the source file key. If all the keys of the database 36 have been examined, execution passes to block 100 where the correspondency manager 70 will instruct the database manager 68 of the source computer 22 to copy or replicate the source file 35 from the source computer 22 to the storage medium 32 of the target computer 24.

As previously mentioned, it is possible that the algorithms used to calculate the keys can result in matching keys even though the files represented by these keys are distinct. While in most situations the key comparison alone will generate a high probability that the files match, the most preferred embodiment of the present invention also incorporates steps to compare the file size and bytes of the file having the matching key with the source file 35 to further increase the probability that the files are, most preferably, identical. As such, if a matching key is located in block 96 by the comparator routine 78, control preferably passes to block 102 where the reader routine 72 of the database manager 68 is called to read the size attribute of the file having the matching key. The size value is returned by the database manager 68 to the correspondency manager 70 where the size of the file having the matching key is compared to the size of the source file 35 in block 104. If the sizes match, control passes to block 106 which ascertains whether the file having the matching key is located on the target computer 24. While it is contemplated that the process for ascertaining whether the file having the matching key is disposed on the target computer 24 can be accomplished in many ways, a preferred process is implemented using the identifier and parent identifier attributes of the objects of the schema 40 of the present invention. Particularly, the parent identifier of the file having the matching key is used to walk up the hierarchial tree of FIG. 3 directory by directory until the root directory object containing the file object representing this matching file is reached. At each directory object along the way, a search is executed for any location objects which are contained by this directory object. If a location object is located, its replication attribute is searched to determine whether it contains an identifier attribute which corresponds to the identifier attribute of the target computer object 54. If such a location object is found, it is then known that the file having the matching key is also located on the target computer 24 because the directory storing this matching file was previously copied to the target computer 24.

If the file having the matching key is disposed on the target computer 24, a byte-to-byte comparison is performed between this file and the source file 35 in block 108. If each byte of the source file 35 matches with a byte of the file having the matching key and both bytes have the same ordinal location, a matching file message is transmitted by the correspondency manager 70 of the source computer 22 to the network manager 76 for transmission to the target computer 24 across the network connection 79, as shown by block 110. The matching file message is processed by the network manager 76 of the target computer 24 and passed to the correspondency manager 70 and then to the replication/synchronization routine 80 of the target computer 24. The matching file message preferably instructs the replication/synchronization routine 80 of the target computer 24 how to implement corresponding the source file 35 by accessing or utilizing the file having the matching key which is located on the target computer 24. This implementation can take the form of file synchronization if a different copy of the source file 35 (e.g., an earlier version, etc.) is also disposed on the target computer 24 or file replication if the only copy of the source file 35 is disposed on the source computer 24. In either case, the replication/synchronization routine 80 can be instructed, for example, to copy and rename the file having the matching key which is disposed on the target computer 24 so that it corresponds with the source file 35, or, alternatively, the replication/synchronization routine 80 can be instructed to merely copy this file so that it corresponds with the source file 35. In each of these cases, the file correspondency is generated by accessing the file having the matching key disposed on the target computer 24 so the contents of the source file 35 are not transferred across the network connection 78, thereby minimizing the amount of network traffic required to establish the file correspondency.

Figure 7:
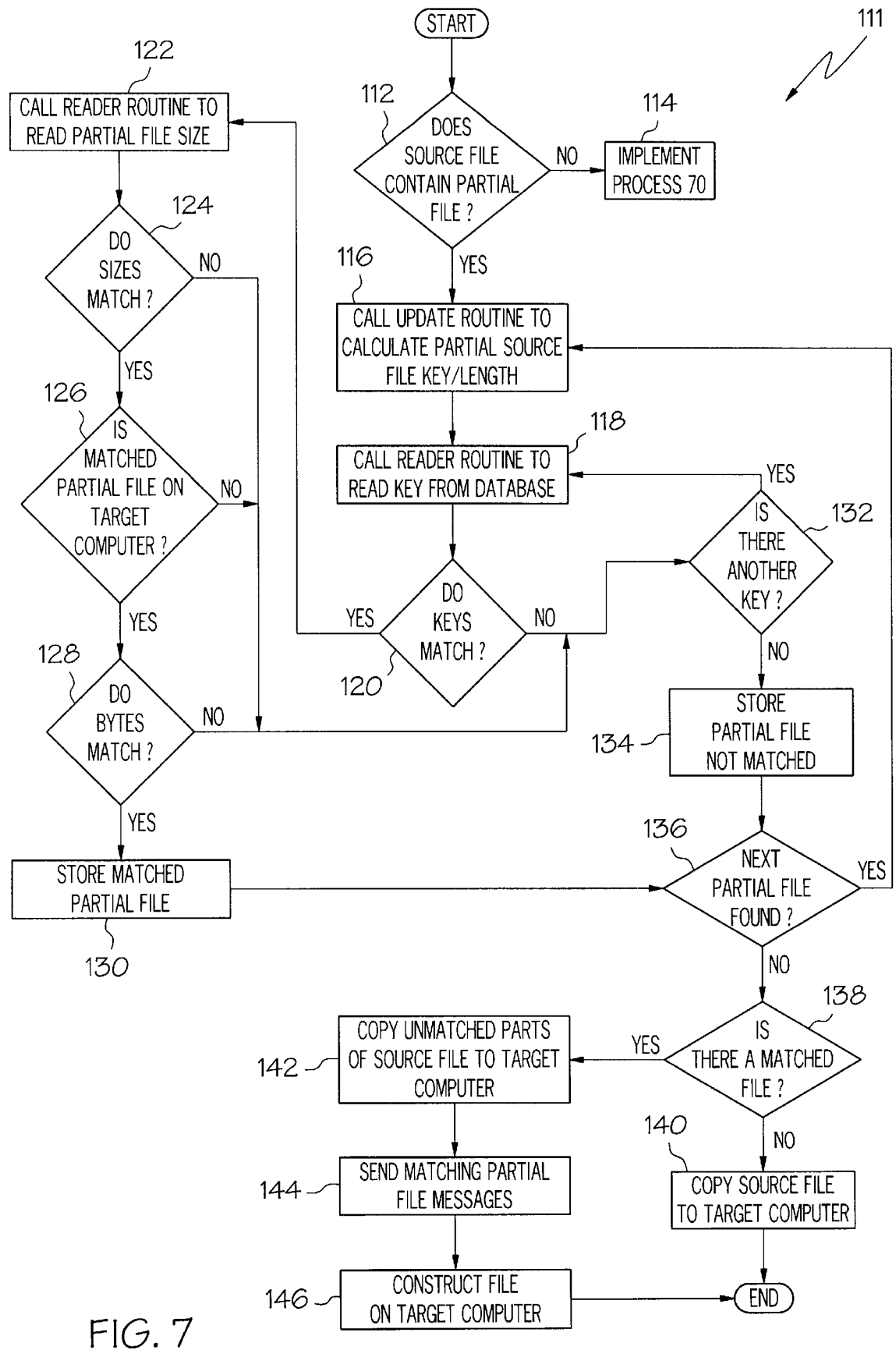
FIG. 7 is a flowchart illustrating another preferred embodiment of a file correspondency process operated in accordance with the present invention

In another embodiment of the present invention, the file correspondency with respect to the source file 35 is implemented by comparing partial source files of the source file 35, as illustrated by a process 111 of FIG. 7. For purposes of discussion herein, the source file 35, by way of example, comprises a first partial source file and a second partial source file which are represented by first and second partial source file objects 60 and 62 of the schema 40, as shown in FIG. 3. Execution begins at block 112 where it is determined whether the source file 35 comprises at least one partial source file. If it does not, the process 70 of FIG. 6 is implemented, as shown in block 114. If the source file 35 does contain at least one partial source file, the update routine 74 of the database manager 68 of the source computer 22 is called to calculate the key for the first partial source file in block 116. Next, a search is made of the database 36 of the source computer 22 for a file or partial file having a key which matches the first partial source file key by calling the reader routine 72 of the database manager 68, as indicated by block 118. The reader routine 72 searches for a key attribute of a file or partial file object stored in the database 36 of the source computer 22 which is set to the on condition. If a key attribute set to the on condition is located, the key stored in the key attribute is passed back to the correspondency manager 70 where the comparator routine 78 is executed in block 120.

The comparator routine 78 compares the key returned by the database manager 68 to the key calculated for the first partial source file. If the returned key matches the first partial source file key, block 122 is executed where the reader routine 72 of the database manager 68 is called to read the size attribute of the file or partial file having the matching key. The size value is returned by the database manager 68 to the correspondency manager 70 where the size of the first partial source file is compared to the size of the file or partial file having the matching key in block 124. If the sizes match, control is passed to block 126 where it is ascertained whether the file or partial file having the matching key is located on the target computer 24, as previously described. If the file or partial file having the matching key is disposed on the target computer 24, a byte-to-byte comparison is performed between the first partial source file and the file or partial file having the matching key in block 128. If the bytes match, a matching file message is stored with respect to the first partial source file which indicates that a matching file or partial file has been located on the target computer 24. If the decisions of either blocks 120, 124, 126, or 128 is no (e.g., file sizes compared in block 124 do not match, etc.), control passes to block 132 where it is determined whether there is another file or partial file object in the database 36 which has its key attribute set to the on condition. If there is, control returns to block 118 where the previously described loop begins anew for comparing the key of this next file or partial file to the key of the first partial source file. If all the file objects of the database 36 have been searched such that another file or partial object having its key set to the on condition is not located in block 132, execution passes to block 134 where a no match file message is stored with respect to the first partial source file indicating that a matching file or partial file is not located on the target computer 24.

Following execution of either of blocks 130 or 134, block 136 is executed to determine if the source file 35 comprises a next or second partial source file. If a second partial source file exists, control returns to block 116 where the previously described loop is repeated to search for a matching file or partial file which is disposed on the target computer 24. If there are no further partial source files, control passes to block 138 where it is determined whether there are any partial source files which have been matched (i.e., for which block 130 has been executed). If there are none, block 140 is executed where the source file 35 is copied in its entirety from the source computer 22 to the target computer 24. If a partial source file has been matched, block 142 is executed to copy any parts of the source file not matched to the target computer 24 so that a file corresponding to the source file 35 can be constructed on the target computer 24. Next, a matching file message is transmitted by the correspondency manager 70 of the source computer 22 to the network manager 76 for transmission to the target computer 24 across the network connection 79, as shown by block 144. As previously discussed, the matching file message is processed by the network manager 76 of the target computer 24 and passed to the correspondency manager 70 and then to the replication/synchronization routine 80 of the target computer 24. The matching file message preferably instructs the replication/synchronization routine 80 of the target computer 24 how to implement corresponding the source file 35 by accessing or utilizing the files or partial files having matching keys which are located on the target computer 24, along with any unmatched parts of the source file which may have been copied to the target computer in block 142, to construct the corresponding file, as shown in block 146.

Again, the above-described file correspondency process minimizes network traffic because any partial source files having a matching file located on the target computer 24 do not have to be transmitted across the network connection 78.

In yet another embodiment, a global index and/or a double linked list can be incorporated to search for matching files which are located on the target computer 24. Particularly, the index could store in a single location the keys for each of the existing files located on the source computer 22, thereby increasing the speed and efficiency of the search for a file or partial file having a key which matches the source file 35 (or partial source files). In addition, a double linked list can be incorporated having forward and backward references to files or partial files on the source computer 22 having matching keys, sizes, and bytes in common. This double linked list would be useful in establishing file correspondency between the source file 35 and a plurality of target computers. For instance, such a list could be traversed to quickly locate a plurality of matching files on plurality of target computers once a first matching file on a first target computer has been located and the size and bytes of this first matching file have been successfully compared, but where this file is not disposed on the other target computers. This double linked list can also be used in the case where a matching file is not located on the target computer containing the existing file but is located on a second target computer, where there is a performance benefit in copying the file from the second target computer to the target computer, instead of copying the file from the source computer to the target computer. An example of where this would be a benefit is where the two target computers are connected by a LAN and the source computer is connected to both target computers by a WAN.

While the preferred embodiments of the present invention have been described in the context where the file having the matching key is located on the source computer 22, and the database 36 of the source computer 22 stores only information relating to files on the source computer 22, it is contemplated that a process of the present invention can be implemented where the file having the matching key is disposed on a third computer. In this instance, the database 36 is preferably provided in the form of a global database storing objects representing files other than the files located on the storage medium 32 of the source computer 22. For example, the database 36 could store objects representing files stored on computers within a logical grouping such as a building, campus, or other geographical location. Alternatively, if a key index is utilized, the key index could store the keys for files located on the computers within one of the above-described geographical groupings. With this arrangement, the steps of blocks 94 (FIG. 6) and 118 (FIG. 7) would include reading keys from the database 36 of the source computer 22 which do not reside on the source computer 22. If desired, the byte-to-byte check of blocks 108 (FIG. 6) and 128 (FIG. 7) can be omitted so as to minimize the amount of network traffic associated with the file correspondency process where the file having the matching key is not disposed on the source computer 22 along with the source file 35.

In a further embodiment of the present invention, the index and/or database 36 stored on storage medium 32 of the source computer 22 comprises information regarding only files located on the source computer 22, as previously discussed, but the steps of blocks 94 (FIG. 6) and 1 18 (FIG. 7) are executed on both the source computer 22 and a third computer connected to the computer network 20 (e.g., one of computers 28 shown in FIG. 1). In other words, the reader routines 72 of each of these computers read the keys of files represented by objects in the databases 36 stored on each of these computers. If a key matching the key representing the source file 35 is located on the third computer, the remaining steps of the correspondency process are executed as previously discussed except that the database and correspondency managers 68 and 70 of the third computer would be executing most of these steps with respect to its database 36, rather than the database and correspondency managers of the source computer 22. In addition, the byte-to-byte comparison of blocks 108 (FIG. 6) and 128 (FIG. 7) between the source file 35 located on the source computer 22 and the file having the matching key located on the third computer can again be omitted for efficiency and to minimize network traffic.

Having shown and described the preferred embodiments of the present invention, further adaptation of the methods and apparatuses for generating file correspondency can be accomplished by appropriate modifications by one of ordinary skill in the art without departing from the scope of the present invention. A number of alternatives and modifications have been described herein and others will be apparent to those skilled in the art. For example, while the preferred processes 70 and 111 of FIGS. 6 and 7, respectively, have been described herein with respect to generating file correspondency on a single target computer 24, it is contemplated that the present invention can also be adapted to generate file correspondency on a plurality of distinct target computers. Alternatively, the present invention can be adapted to generate file correspondency within a single computer (i.e., the source computer and the target computer are the same computer). Accordingly, the scope of the present invention should be considered in terms of the following claims and is understood not to be limited to the details of the structures and methods shown and described in the specification and drawings.

What is claimed is:

1. A process for generating a file correspondency between at least a portion of a source file disposed on a source computer and a target computer, comprising the following steps:

(a) calculating a first source file key for at least a portion of the source file;

(b) searching for an existing file having at least a portion thereof represented by a first existing file key which matches the first source file key;

(c) determining whether the portion of the existing file represented by the first existing file key is also disposed on the target computer; and (d) if the first existing file key is located and if the portion of the existing file represented by the first existing file key is also disposed on the target computer then accessing the portion of the existing file which is disposed on the target computer for generating the file correspondency between the source computer and the target computer with respect to the portion of the source file.

2. The process of claim 1, wherein step (a) is performed by reading the first source file key from a database by a reader routine.

3. The process of claim 1, wherein step (a) is performed by calculating the first source file key by an update routine.

4. The process of claim 1, wherein the portion of the source file represented by the first source file key comprises the entire source file.

5. The process of claim 1, wherein the portion of the existing file represented by the first existing file key comprises the entire existing file.

6. The process of claim 1, wherein the source file comprises a plurality of partial source files, further comprising the step of determining a plurality of source file keys, each one of the plurality of source file keys representing at least one of the plurality of partial source files.

7. The process of claim 6, wherein the existing file comprises a plurality of partial existing files, further comprising the step of calculating a plurality of existing file keys, each one of the plurality of existing file keys representing at least one of the plurality of partial existing files.

8. The process of claim 7, further comprising the step of searching the plurality of existing file keys for one of the plurality of existing file keys which matches one of the plurality of source file keys.

9. The process of claim 8, wherein at least one of the plurality of partial source file keys does not match one of the plurality of existing file keys, further comprising the step of copying to the target computer the one of the plurality of partial source files represented by the one of the plurality of source file keys which does not match one of the plurality of existing file keys.

10. The process of claim 1, wherein step (b) is performed only on the source computer.

11. The process of claim 1, wherein step (b) is performed on the source computer and a second computer, the source computer and the second computer being in data communication with each other.

12. The process of claim 1, wherein the step of generating the file correspondency comprises file synchronization.

13. The process of claim 1, wherein the step of generating the file correspondeney comprises file replication.

14. The process of claim 1, further comprising the step of instantiating a first object from a class in a schema, the first object being associated with the portion of the existing file represented by the first existing file key.

15. The process of claim 14, further comprising the step of instantiating a second object from the first class in the schema, the second object being associated with the portion of the source file represented by the first source file key.

16. The process of claim 1, wherein the portion of the existing file has a size attribute associated therewith.

17. The process of claim 1, wherein step (c) further comprises the following steps:
(a) calculating a size for the portion of the source file represented by the first source file key;
(b) calculating a size for the portion of the existing file represented by the first existing file key;
(c) comparing the size of the portion of the source file represented by the first source file key to the size of the portion of the existing file represented by the first existing file key, and
(d) accessing t he portion of the existing file represented by the first existing file key only if the size of the portion of the source file represented by the first source file key matches the size of the portion of the existing file represented by the first existing file key.

18. The process of claim 1, wherein the step of accessing the portion of the existing file represented by the first existing file key is performed only if each byte of the portion of the source file represented by the first source file key matches a byte of the portion of the existing file represented by the first existing file key.

19. The process of claim 1, wherein the steps are stored as a set of instructions on a computer-readable medium.

20. The process of claim 1, wherein the source computer and the target computer are the same computer.

21. The process of claim 1, further comprising the step of searching a linked list to locate one of a plurality of existing files, the one of the plurality of existing files having at least a portion thereof represented by the first existing file key.

22. A computer system for generating file correspondency, comprising:
a source computer;
a target computer in data communication with the source computer;
a source file disposed on the source computer,
at least one existing file disposed on both the source computer and the target computer;
a first source file key representing at least a portion of the source file;
a first existing file key representing at least a portion of the existing file;
a reader routine for reading the first source file key and first existing file key;
a comparator routine in data communication with the reader routine, the comparator routine having a set of instructions for determining whether the first source file key matches the first existing file key;
a replication/synchronization routine in data communication with the comparator routine, the replication/synchronization routine having a set of instructions for generating file correspondency between the source computer and the target computer by accessing at least a portion of the existing file disposed on the target computer.

23. The process of claim 15, further comprising the step of instantiating a third object from a second class in the schema, wherein the third object is associated with the target computer.

24. The process of claim 23, further comprising the step of storing the first existing file key as an attribute of the first object.

25. The process of claim 24, further comprising the step of instantiating a fourth object from a third class in the schema, wherein the fourth object represents a file directory and has associated therewith a location attribute for identifying at least one computer on which the file directory represented by the fourth object is located.

26. The process of claim 25, further comprising the step of instantiating a fifth object from a fourth class of the schema, wherein the fifth object stores the location attribute.

27. The process of claim 25, further comprising the step of storing the first, second, third and fourth objects in an object oriented database.

28. The process of claim 27, further comprising the steps of:
searching the object oriented database for the first object and reading the attribute storing the first existing file key;
searching the object oriented database for the fourth object and reading the location attribute associated therewith; and
determining whether the location attribute of the fourth object references the third object associated with the target computer.

29. The process of claim 28, wherein the step of generating file correspondency further comprise the step of copying at least the portion of the existing file disposed on the target computer.

* * * * *

UNITED STATES PATENT AND TRADEMARK OFFICE
CERTIFICATE OF CORRECTION

PATENT NO. : 5,950,198
DATED : Sept. 7, 1999
INVENTOR(S) : Falls, et al

It is certified that error appears in the above-identified patent and that said Letters Patent is hereby corrected as shown below:

Claim 13, column 15, line 31, change "correspondeney" to --correspondency--.

Claim 14, column 15, line 33, between "a" and "class" insert --first--.

Claim 17, column 15, line 53, change "t he" to read --the--.

Signed and Sealed this

Twenty-second Day of February, 2000

*Attest:*

Q. TODD DICKINSON

*Attesting Officer*  *Commissioner of Patents and Trademarks*